(12) United States Patent
Gustafson (10) Patent No.: US 7,740,153 B2
(45) Date of Patent: Jun. 22, 2010

(54) DISPENSING CONTAINER FOR TWO BEVERAGES

(76) Inventor: David R. Gustafson, 4282 Evergrenn La. North, Plymouth, MN (US) 55441

( * ) Notice: Subject to any disclaimer, the term of this patent is extended or adjusted under 35 U.S.C. 154(b) by 831 days.

(21) Appl. No.: 11/599,564

(22) Filed: Nov. 14, 2006

(65) Prior Publication Data

US 2008/0110899 A1    May 15, 2008

(51) Int. Cl.
B67D 7/06    (2010.01)
(52) U.S. Cl. .................. 222/144.5; 222/130; 222/470; 222/471; 222/475.1; 222/509; 222/545; 220/543
(58) Field of Classification Search ............. 222/129, 222/144.5, 130–131, 475.1, 545, 482–485, 222/470–474, 505, 509; 141/331, 334, 297; 215/13.1; 220/522, 553
See application file for complete search history.

(56) References Cited

U.S. PATENT DOCUMENTS

| | | | |
|---|---|---|---|
| 43,154 | A | 6/1864 | Heneage |
| 869,702 | A | 10/1907 | Friend |
| 1,025,653 | A | 5/1912 | Sims |
| 1,312,203 | A * | 8/1919 | Picard ................ 222/129 |
| 1,393,250 | A | 10/1921 | Sharbaugh |
| 1,472,007 | A | 10/1923 | Jones |
| 1,518,887 | A | 12/1924 | Widmann |
| 1,762,637 | A | 6/1930 | McCarthy |
| 2,396,460 | A | 3/1946 | Di Pietro |
| 2,502,821 | A | 4/1950 | Brauner |
| 2,604,233 | A | 7/1952 | Murphrey |
| 2,681,745 | A | 6/1954 | Sung et al. |
| 2,685,978 | A | 8/1954 | Crockett |
| 2,937,792 | A | 5/1960 | Firstenberg |
| 3,863,673 | A | 2/1975 | Sitron |
| 4,191,311 | A | 3/1980 | Auguadro |
| 4,648,535 | A | 3/1987 | Zimmermann |
| 4,651,900 | A | 3/1987 | Horvath et al. |

(Continued)

FOREIGN PATENT DOCUMENTS

GB    1325007    8/1973

(Continued)

Primary Examiner—Frederick C. Nicolas
(74) Attorney, Agent, or Firm—James V. Harmon (57) ABSTRACT

A serving container for selectively dispensing one of two beverages includes a container body having an upper open mouth at the top and a vertically disposed partition to divide the container body into a pair of laterally disposed left and right compartments to hold two different beverages. The partition has a horizontally disposed sealing edge at the top between the compartments. A removable cover has a cooperating sealing surface adapted to engage the edge of the partition to form a seal that prevents mixing of the contents of the compartments when the cover is secured to the mouth of the container. A pair of selectively operable left and right valves are mounted in the cover to permit a beverage held in a selected storage compartment of the container to flow into either of two separate transfer chambers when a corresponding one of the valves is in an open position. From the transfer chambers the beverages flow through a pair of separate forwardly and upwardly extending passages that terminate in separate outlet nozzles located on the front of the cover above the rim of the container or if desired on a front portion of the container body below the cover.

15 Claims, 7 Drawing Sheets

U.S. PATENT DOCUMENTS

| | | |
|---|---|---|
| 4,676,411 A | 6/1987 | Simasaki |
| 4,703,871 A | 11/1987 | Broker |
| 4,750,644 A | 6/1988 | Kolody |
| 4,773,563 A | 9/1988 | Taylor |
| 4,809,884 A | 3/1989 | Stackhouse |
| 5,037,015 A | 8/1991 | Collins |
| 5,072,858 A | 12/1991 | Brashier |
| 5,240,145 A | 8/1993 | Hoberg |
| 5,265,767 A | 11/1993 | Gustafson |
| 5,335,589 A | 8/1994 | Yerves, Jr. |
| 6,137,417 A | 10/2000 | McDermott |
| 2003/0006247 A1 | 1/2003 | Olivier et al. |

FOREIGN PATENT DOCUMENTS

| | | |
|---|---|---|
| SU | 1253615 | 8/1986 |

\* cited by examiner

DISPENSING CONTAINER FOR TWO BEVERAGES

FIELD OF THE INVENTION

This invention relates to beverage dispensing and more particularly to a beverage serving container or pitcher that can be carried in one hand with provision for selectively dispensing either of two beverages.

BACKGROUND OF THE INVENTION

Because of the popularity of decaffeinated coffee, it is common in restaurants to have two pots or pitchers available for customers, one containing regular coffee and the other decaffeinated coffee. Portable coffee pots have been proposed for use in restaurants and cafeterias for dispensing two beverages, but previous dispensers have been complicated in construction and difficult to fill or keep clean, or are difficult to operate because they require an awkward movement of the thumb or finger to dispense beverages selectively. Some of these containers have a very small top opening, making them difficult to fill and to clean. Others tend to leak when a beverage is being dispensed.

The serving container of my prior U.S. Pat. No. 5,265,767, which is incorporated herein by reference, while very good, had certain areas for potential improvement. For example, small amounts of regular caffeinated coffee remaining in a space above the valves or in the spout could become mixed with decaffeinated coffee dispensed at a later time. In addition, a spout that was built into one side of the container body added complexity to the container and because it projected from the side of the container, it was subject to breakage. Moreover, the coffee flowed first from the cover into the spout and then from the spout to a cup. This further complicated cleaning and also tended to cool the coffee. Additionally, in the patented dispenser, a consumer in some cases could not be sure he was getting the right kind of coffee since both regular and decaf flowed through the same chamber and came out of the same spout.

In view of these and other deficiencies of the prior art, it is one object of the present invention to provide an improved container for dispensing two beverages which includes a cover that seals the container to keep out contaminants yet allows no mixing of the beverages within the cover.

Another object of the invention is to provide an improved container for dispensing beverages which allows a customer to observe visually that either of two beverages can be dispensed by a serving person and to confirm that the correct beverage is being served.

Another object of the invention is to provide an improved container that will dispense either of two beverages at an adequate flow rate but will not permit the beverages to become mixed.

Yet another object is to provide a serving container with a provision for sealing two different streams of beverages from a compartment containing valve actuators for controlling the flow thereof.

Still another object is to provide a container for dispensing two beverages through either of two valves positioned below the mouth of the container but enable the beverages to flow forwardly in separate streams through a spout positioned above the mouth of the container.

These and other more detailed and specific objects of the present invention will be better understood by reference to the following Figures and detailed description which illustrate by way of example but a few of the various forms of the invention within the scope of the appended claims.

SUMMARY OF THE INVENTION

In a preferred form of the invention, a divided serving container is provided for selectively dispensing either of two different beverages. A container body has an upper open mouth at the top and a vertically disposed partition to divide the container body into a pair of laterally disposed left and right compartments. A removable cover fits within the mouth at the top of the container body, and the partition has a horizontally disposed upper sealing edge located between the compartments below the cover. The cover has a cooperating sealing surface positioned to engage the edge of the partition to form a seal that prevents mixing of the beverages in the compartments when the cover is in place on the container. Left and right valves are provided in a lower part of the cover on either side of the sealing surface. Separate transfer chambers are provided within the cover above the valves, each in communication with one of the valves. Extending forwardly as a protuberance that is part of the cover is a divided spout terminating in two separate nozzles. A passage extends between each of the transfer chambers and one of the nozzles. In a preferred form, each of the passages is a riser passage that carries the beverages upwardly and forwardly in two separate streams to the nozzles which are located above the mouth opening at the top of the container body.

BRIEF DESCRIPTION OF THE DRAWINGS

The FIG. 8 is a top plan view of the beverage container in accordance with one optional form of the invention.

DETAILED DESCRIPTION OF THE PREFERRED EMBODIMENTS

Figure 1:
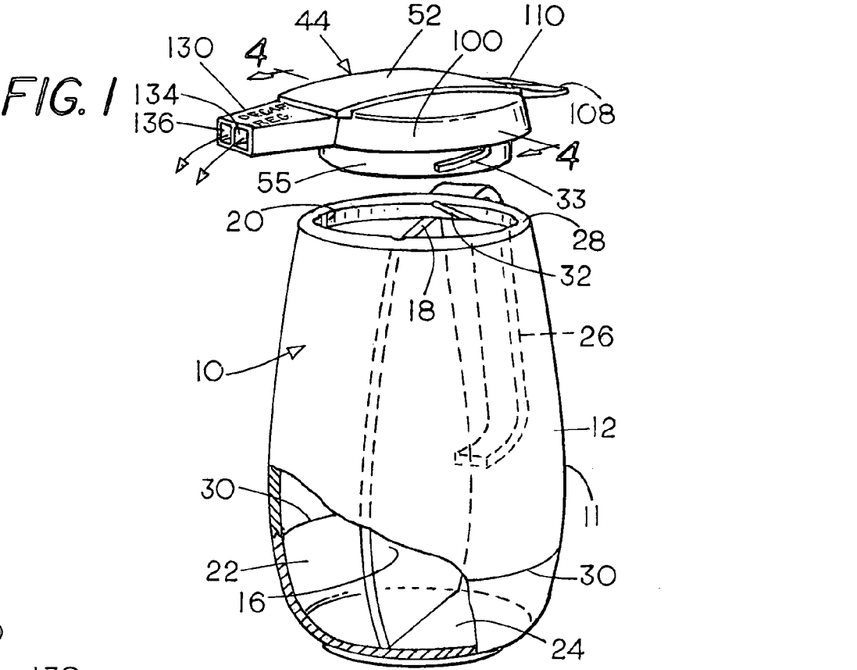
FIG. 1 is a perspective exploded view of one preferred form of the invention partly broken away.
Figure 2:
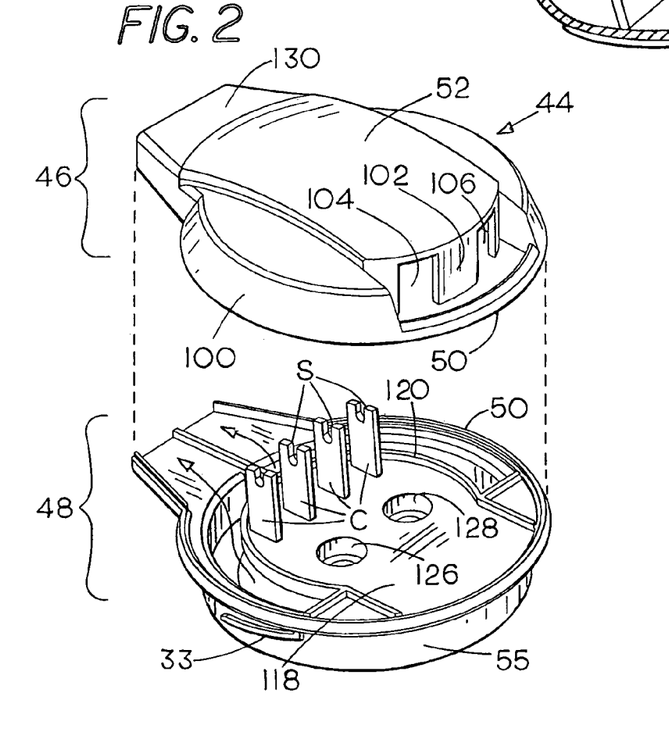
FIG. 2 is a top perspective exploded view of the cover on a larger scale showing the upper and lower portions thereof with internal components removed for clarity of illustration.

Refer now to the Figures in which the same numerals refer to corresponding parts in the several views and particularly to FIG. 1 which illustrates a beverage container 10 to be used by way of example for regular coffee and decaf coffee. The body 11 of the container 10 is preferably formed from molded plastic resin having a convex sidewall 12, a bottom wall 14, and a vertically disposed central partition 16 with a free upper sealing edge 18. The container body 11 can be either insulated or uninsulated depending upon the application. At its upper end is an open mouth 20 which communicates with compartments 22 and 24 on opposite sides of the partition 16 in which beverages, in this example regular coffee and decaf coffee respectively, are kept ready to be poured into cups as will be described below. In alignment with the partition 16 at the rear of the container is a carrying handle 26. A rim 28 around the open mouth 20 of the beverage container 10 is a flat continuous surface without an interruption of the kind adjacent the spout in my prior U.S. Pat. No. 5,265,767. At the widest part of the container body 12 is provided a seam 30 where the bottom and top portions of the container body are bonded together, e.g. by sonic welding. Inside the mouth of the container body are threads 32 that cooperate with mating thread 33 on the cover to provide a bayonet connection for holding a removable cover 44 in place as will be described below.

Figure 4:
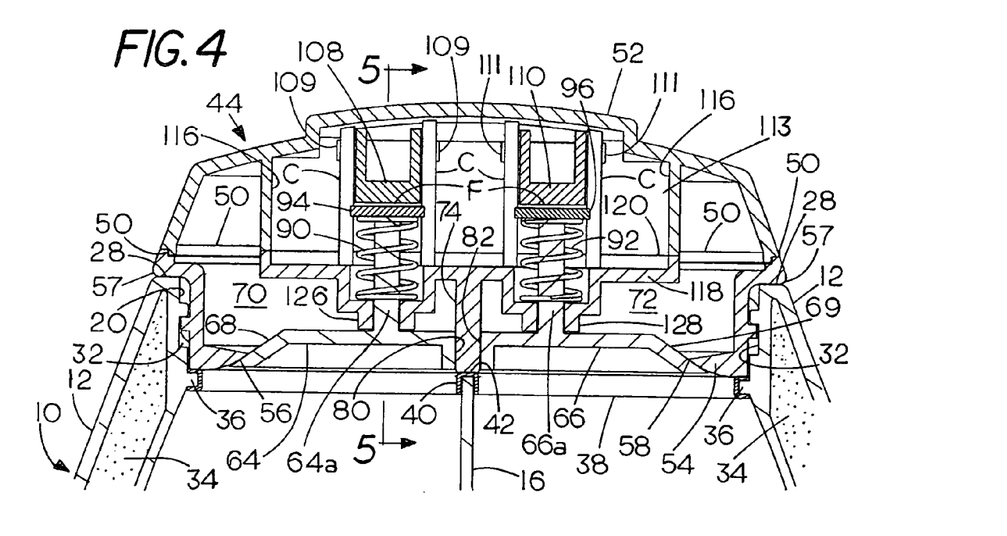
FIG. 4 is a vertical sectional view of the dispensing container taken on line 4-4 of FIG. 1 on an enlarged scale with the cover shown attached.
Figure 5:
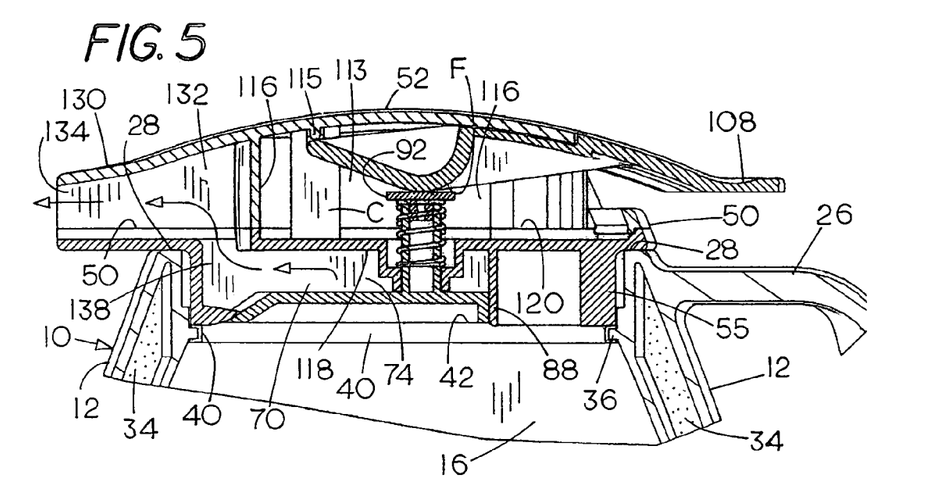
FIG. 5 is a vertical cross-sectional view taken on line 5-5 of FIG. 4.

As shown in FIGS. 4 and 5, the sidewall 12 of the container body 11 can be filled within insulating material 34 if desired. An annular flange 36 can be seen in FIG. 4 inside the mouth 20 of the container body in alignment with the top of the partition 16. Mounted on the flange 36 is a circular gasket 38 which can be formed of suitable sealing material such as flexible polymer, rubber, or the like that includes a diametrically extending segment 40 which forms the top edge of the partition 16 to provide an upwardly facing sealing surface 42. The dispensing cover 44 is placed in the mouth of the container body 11 during use as shown in FIGS. 1, 4, and 5.

The removable cover 44 will now be described in more detail with particular reference to FIGS. 2-5. The term "removable" herein means that the cover can at least be withdrawn from the open mouth 20. While the cover 44 can be made of various materials, it is particularly advantageous to employ a thermoplastic or a thermosetting resin that can be formed by injection molding or other suitable molding process. It is convenient to mold the plastic cover as two separate components comprising an upper cover body portion 46 and a lower cover body portion 48 (FIGS. 2 and 3) that are sealed together in any suitable manner as by means of an adhesive or by sonic welding along an intermediate horizontal seam or parting line at 50 to form a hollow cover having a top wall 52 and a circular bottom wall 54 which is sealed when the cover is in use against the gasket 38 as shown in FIGS. 4 and 5. Extending upwardly from the bottom wall 54 is a cylindrical sidewall 55 that is appropriately sized to slide into the mouth 20 of the beverage container body 11 as the periphery of bottom wall 54 forms a hermetic seal against the gasket 40. At the same time, the lower edge 74a of a vertical partition 74 within the cover makes sealing contact with the upper edge 18 of the partition 16 while mating threads 32 and 33 securely hold the cover 44 in place within the mouth 20 of the container body 11 so that the downwardly facing shoulder 57 of the cover rests against the rim 28 of the container body 11.

In the course of developing the present invention it was found that several important benefits could be obtained by providing a way for the beverage to flow upwardly in two separate streams from a pair of valves to a divided nozzle. However, it was also found necessary to fulfill two additional objectives at the same time. The first was to keep the valve actuator including the valve actuating levers apart, i.e. sealed from two separate ascending streams so that the coffee or other beverage would not spill out onto the server's hand or the container be open to the air so as to allow foreign material to enter. Second, it was necessary to enable the two separate streams of the beverage to flow around a valve actuator chamber and then to nozzles that are at a higher elevation. The following discussion describes how these objectives are achieved.

Figure 3:
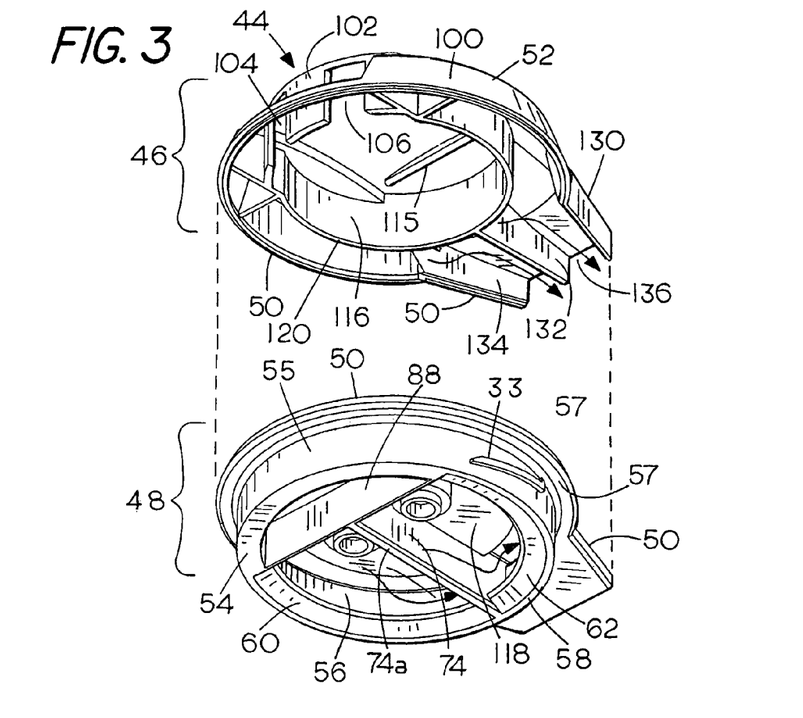
FIG. 3 is a bottom perspective exploded view similar to FIG. 2.

In the bottom wall 54 of the cover 44 as seen in FIGS. 3 and 4 are a pair of laterally spaced apart left and right valve ports 56 and 58 respectively with valve seats 60 and 62 and a pair of laterally spaced apart left and right poppet valves 64 and 66 that are configured with upwardly facing inclined circular sealing surfaces 68 and 69 respectively that extend between two vertical sealing surfaces which are at right angles to one another. As seen in plan view, each valve has the shape of a circular sector with one of the inclined circular valve-sealing surface on its outer edge. Above the poppet valves 64, 66 are left and right transfer chambers 70 and 72 which are separated by the vertically disposed fore and aft partition 74 having lower edge 74a (FIG. 3) that forms a seal at 42 with the gasket 38 comprising the top of partition 16. Partition 74 also forms a seal with corresponding flat valve surfaces 80 and 82. A pair of a vertically disposed laterally spaced apart valve guide openings 126 and 128 each with a vertical bore for valve stems 64a and 66a which are slideably mounted therein are provided in the horizontal panel 118 on opposite sides of the partition 74. The valves 64 and 66 are also have flat vertically disposed laterally extending sealing surfaces 84 and 86 that form a sealing relationship with a transverse wall 88 that is connected along its upper edge to the panel 118. The valves are yieldably biased in an upward direction by valve springs 90 and 92 which are held in place following installation by spring retainers 94 and 96 that can be bonded over the springs by a suitable adhesive or by a snap connection or the like. It will be noted that the partition 74 performs three functions. It separates chambers 70 and 72; it forms a seal with partition 16, and also forms a seal with valves 64 and 66.

Figure 6:
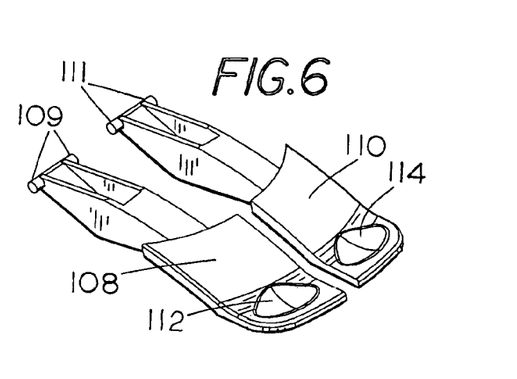
FIG. 6 is a top perspective view of the left and right valve actuator levers.
Figure 7:
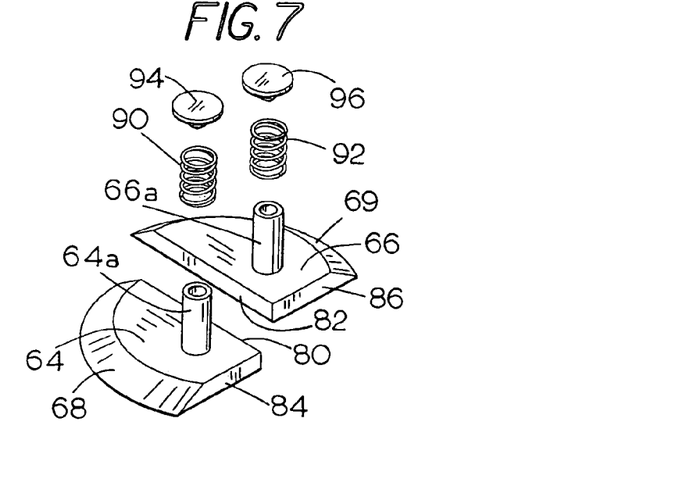
FIG. 7 is a top exploded perspective view of the valves and valve springs.
Figure 8:
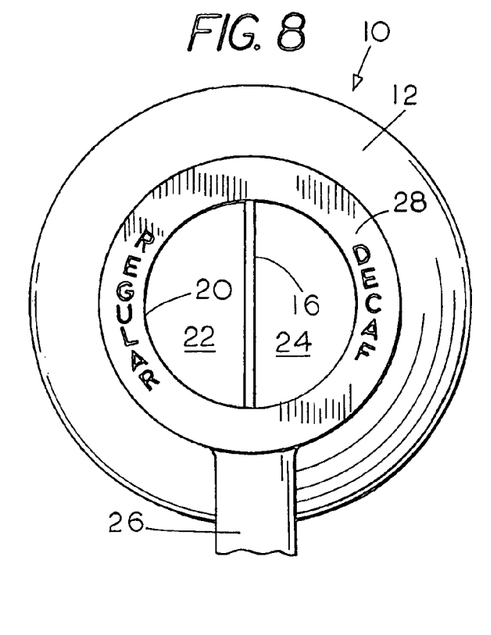
Figure 9:
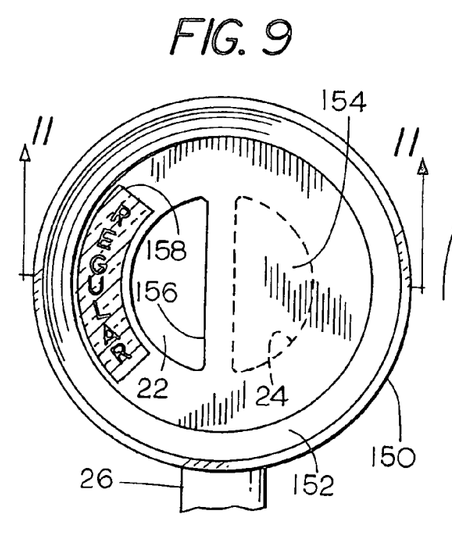
FIG. 9 is a top plan view of a filling funnel mounted on the dispensing container of FIG. 8 in position for pouring in regular coffee.
Figure 10:
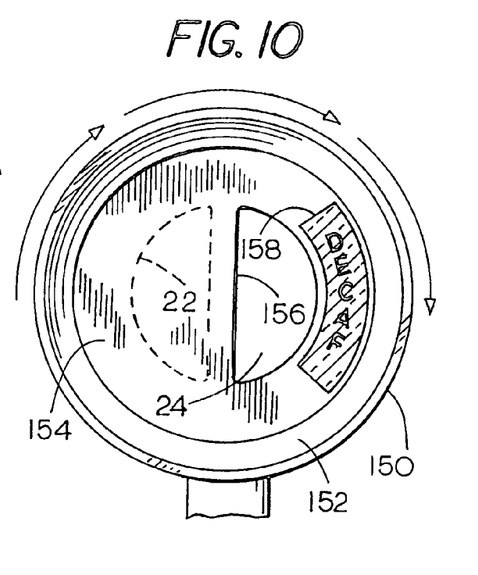
FIG. 10 is a plan view similar to FIG. 9 showing the filling funnel in position for filling the dispensing container with decaf coffee.
Figure 11:
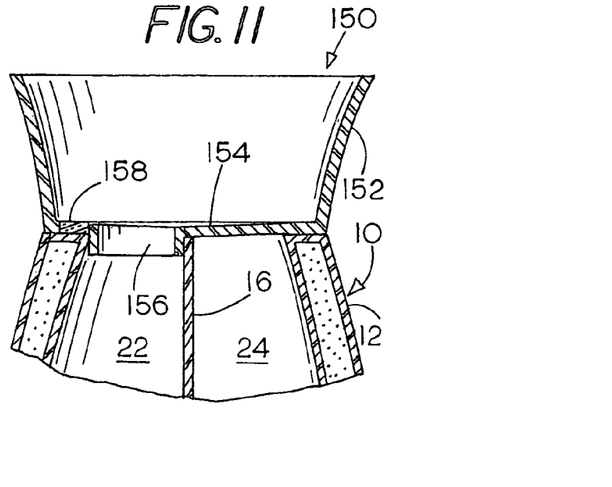
FIG. 11 is a vertical sectional view taken on line 11-11 of FIG. 9.

The top portion 46 of the cover 44 has a sidewall 100, and a rear wall 102 with a pair of laterally spaced apart rearwardly facing openings 104 and 106 to accommodate left and right valve actuator levers 108 and 110 (FIGS. 4-6) having rearwardly extending upwardly exposed faces 112 and 114 for the server's thumb enabling the server to apply manual pressure to a selected one of the valves for dispensing the desired beverage, e.g. either regular or decaf coffee or, if desired, both valves can be pressed simultaneously to provide a mixture of two beverages, e.g. a reduced caffeine coffee. At the forward end of the valves are pivot pins 109 and 111 by which the levers are pivotally mounted in slots S at the upper end of columns C that are themselves integral with the lower portion 48 of the cover 44 as shown in FIGS. 4 and 5. A downwardly facing convex surface F on each lever 108 and 110 rests against one of the spring retainers 94, 96 so that during use when thumb pressure is applied to the free ends of one of the levers 108 or 110, the selected valves 64, 66 will be forced downwardly against the pressure of the springs 90, 92 thereby opening the appropriate valve. The levers 108 and 110 can be retained in slots S by means of a hold-down bar 115 which projects downwardly from the top wall 52 as shown in FIGS. 3 and 5. The convex surface F of each valve actuator will provide low-friction sliding contact with the upper surface of each spring retainer. The invention provides good flow rates, but if even greater flow rates are desired, the convex surfaces F can be raised and the valve stems lengthened correspondingly to give each valve a longer stroke.

The valve actuator levers 108, 110 are each located in a valve actuator chamber 113 (FIG. 5) which is defined by a generally circular front and sidewall 116 and the panel 118. Chamber 113 is sealed on its edges along a horizontal seal line 120 formed, e.g. by sonic welding between upper and lower parts of the cover, thus sealing off the chamber holding the valve actuator levers from both transfer chambers 70, 72. This also prevents foreign material from contacting the beverage once the cover 44 is in place on the container body as shown in FIGS. 4 and 5.

Above the rim 28 of the container body 11 is a forwardly extending horizontally disposed spout 130 that projects as a protrusion from the main body of the cover 44. The spout 130 has a central vertically disposed partition 132 that divides the spout into two channels or ducts which terminate forwardly in nozzles 134 and 136. A pair of spaced apart riser passages 138, 140 are provided between the transfer chambers 70 and 72 and the left and right channels of the spout and the nozzles 134 and 136 to enable two separate streams of beverage to flow upwardly from transfer chambers 74 and 76 which are below the rim 28 to the nozzles which are above the rim. It can be seen that beverages from storage compartments 22 and 24 are kept completely separate in cover 44 with no possibility of mixing even in small amounts during or after use. In addition, the server as well as the person whose cup is being filled is able to easily observe regular coffee flowing out through the left outlet duct 34 when the actuator valve 108 is depressed while a stream of decaf coffee is easily distinguished from a stream of regular coffee as decaf is dispensed from the right outlet duct 36. This gives the consumer a comfortable feeling that she is getting the coffee she ordered.

Figure 5A:
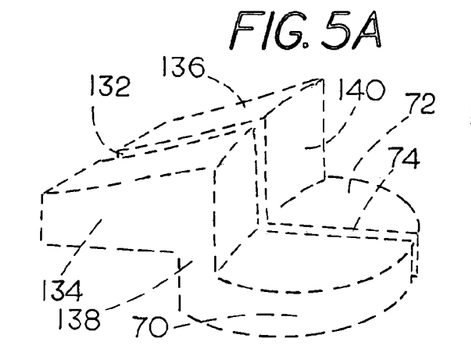
FIG. 5A is a diagrammatic perspective view of the flow channels within the cover in accordance with a preferred form of the invention.

FIG. 5a illustrates diagrammatically how the transfer chambers 70, 72 above the valves which are separated by the partition 74 enable two streams of coffee to ascend within risers 138 and 140 to the outlet nozzles 134 and 136 from valves which are below the rim 28 and below the actuator chamber 113. It can be seen that while both valves 64 and 66 are positioned as shown below the valve actuator chamber 113, there is a way for the beverage to flow around chamber 113 with a circular motion as it travels forwardly (see FIG. 2), then upwardly through the riser passages 138 and 140 while at the same time the valve actuator chamber 113 is sealed off from both transfer chambers 70 and 72 so that coffee cannot spill out or foreign material be allowed to enter the transfer chambers. The invention thus allows a beverage on either side of the partition 74 to flow around the actuator chamber 113 and out through separate nozzles 134 and 136.

Refer now to FIGS. 8-11. In order to easily fill the container 10 with a beverage such as regular coffee on the left and decaf coffee on the right, a special funnel 150 is provided that has a funnel-shaped top portion 152, a slightly inclined circular bottom wall 154 of about the same size as the container mouth 20, and an outlet spout 156 that is shaped appropriately, in this case with a generally D-shaped configuration to fit into the top of either of the compartments 22 or 24 on opposite sides of the partition 16. The funnel 150 is either formed from an opaque material or a transparent plastic that is painted except laterally of the spout 156 where a transparent window 158 is formed by an area free of paint to ensure failsafe filling so that when the funnel 150 is placed on top of the container 10 while filling the left side with regular coffee, the word "regular" or other indicia printed on the left side of the rim 28 can be seen through the window 158, but when the funnel 150 is turned 180° for filling the right chamber, the word "decaf" can be seen through the window 158 thereby ensuring that a person cannot make a mistake in filling the container with decaf coffee when regular is intended or vice versa.

Figures 12, 13, 14, 15:
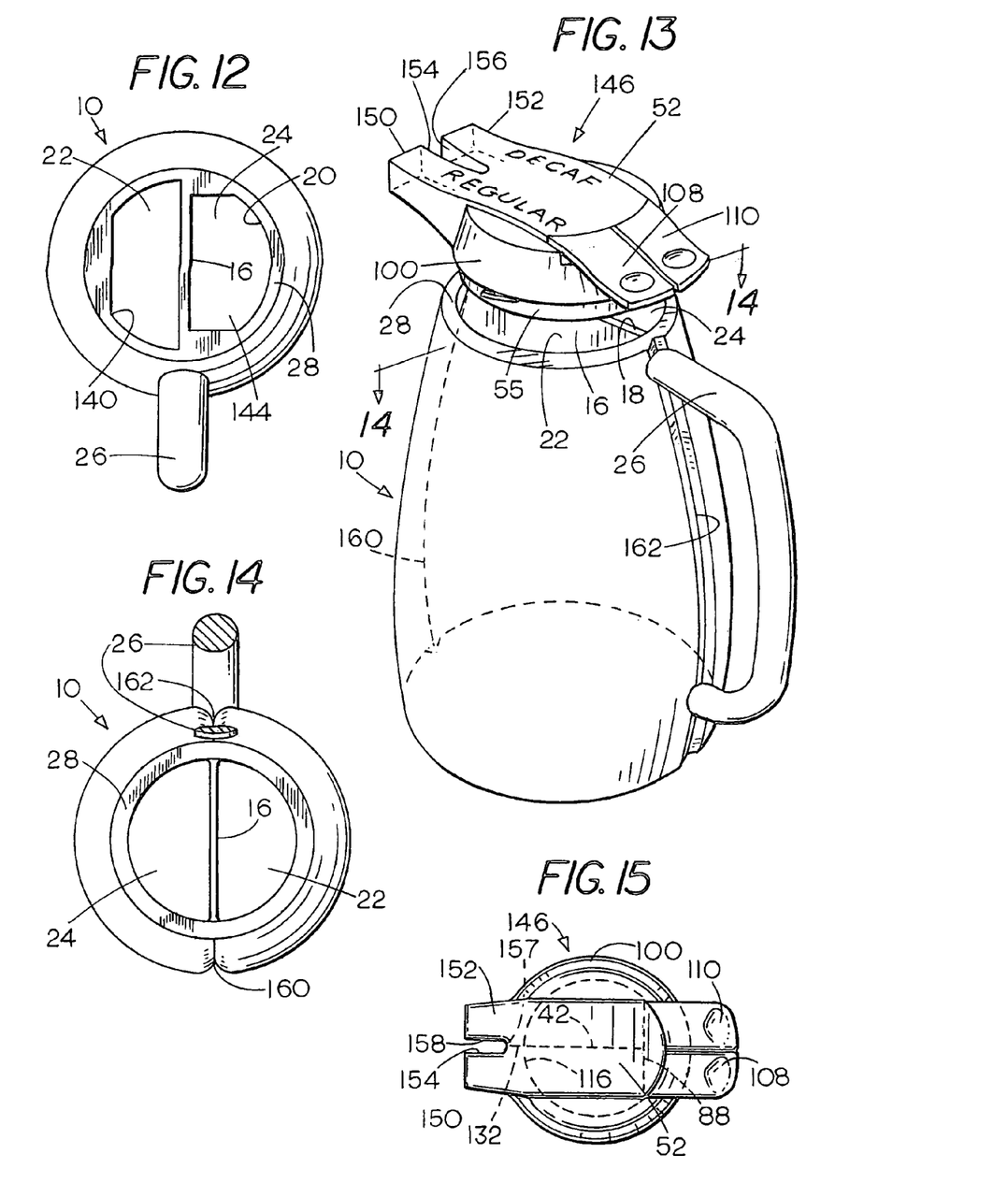
FIG. 12 is a top plan view of another optional form of dispensing container having mouth openings of different shapes.
FIG. 13 is a top exploded perspective view showing another form of the invention.
FIG. 14 is a plan view taken on line 14-14 of FIG. 13 on a smaller scale.
FIG. 15 is a top plan view of the cover of FIG. 13 on a reduced scale.

Refer now to FIG. 12 which shows how the same objective can be obtained in a different way. In this instance, two funnels 150 are suitably marked, e.g. using different colors, say dark brown for regular coffee and orange for decaf coffee, each having a spout 156 of a different shape, so that the spout of the dark-colored funnel 150 fits an opening to the left of the partition 116 having a first configuration while an orange-colored decaf funnel has a spout shaped to fit only an opening 144 that has a different configuration on the right of the partition. Thus, each funnel 150 and the container body have interfitting shapes associated with the respective openings above compartments 22 and 24. This again provides a failsafe system to prevent an inadvertent mix-up in the beverages being poured into the container 10.

It was also found in developing the present invention that it is desirable to make it apparent both to the server and the person whose cup is being filled, that the beverage that was requested is the one being dispensed. Refer in this connection to FIGS. 13 and 14 wherein corresponding numerals refer to the same parts already described. In this optional embodiment, the cover indicated at 146 is of the same internal construction as already described including the cover body containing valves, levers, and chambers the same as set forth above. However, in this optional embodiment the spout is divided into two separate forwardly extending ducts or branches 150 and 152 each having separate top, bottom and side walls including spaced apart vertically disposed central side walls 154 and 156 that converge and meet partition 132 at a junction point 157 (FIG. 15) so as to space the ducts 150 and 152 apart from one another giving the user even more convincing evidence owing to the separation of the streams of coffee that can flow from the cover 146 to confirm that the desired beverage is indeed being dispensed. If desired, a visually apparent demarcation can be provided between the storage compartments 22 and 24 by employing a visual indicator, in this case an obvious groove on the outside surface of the container 10 between the two compartments comprising a front groove 160 and a rear groove 162 aligned with the edges of partition 116 so that anyone viewing the container 10 can see that it is different from an ordinary container, the demarcation grooves 160 and 162 suggesting the presence of two separate compartments inside. The demarcation can also be provided in ways other than the grooves 160, 162, for example, by a demarcation line of a contrasting color (not shown) running vertically in each location where the grooves are shown in FIGS. 13 and 14 or by coloring each half of the container body a different color, again suggesting a division of the container into two compartments. These features help to make it more apparent at first glance that the container 10 has two storage compartments while the separated ducts 150, 152 quickly convey the impression that either of two selected beverages can be dispensed as desired and help confirm that the right one is being dispensed.

It will be noticed that the paired riser passages 138 and 140 make it possible for the beverages to flow as two separate streams from the valves to a level high enough so that the dispensing spout is above the rim of the container enabling two separate streams of beverages to flow past the rim 28 of the container 10 and out through separate nozzles during use. The separate side-by-side riser passages each communicate between one of the nozzles and the transfer chamber above one valve. It can also be seen that the nozzle 130 is a protuberance that projects forwardly as a part of the cover to carry two independent beverage streams to two dispensing nozzles 134, 136 separated by the partitions 74 and 132 so that different beverages cannot become mixed while allowing separate streams of the beverages to be easily seen and distinguished visually from one another. This distinction is aided by alignment of the separate nozzles with corresponding valve levers 108 and 110.

Figure 16:
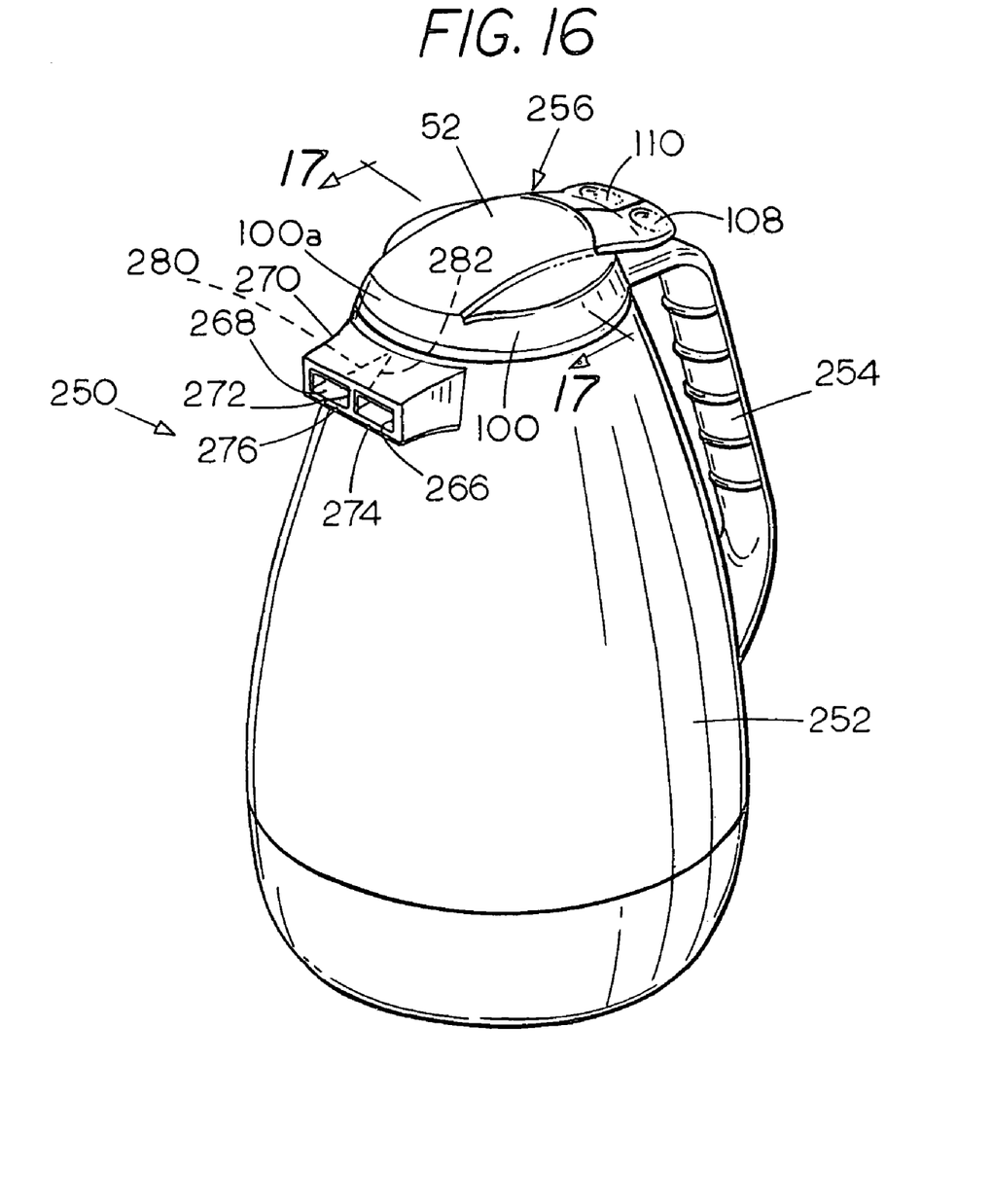
FIG. 16 is a top perspective view of an alternative form of the invention.
Figure 17:
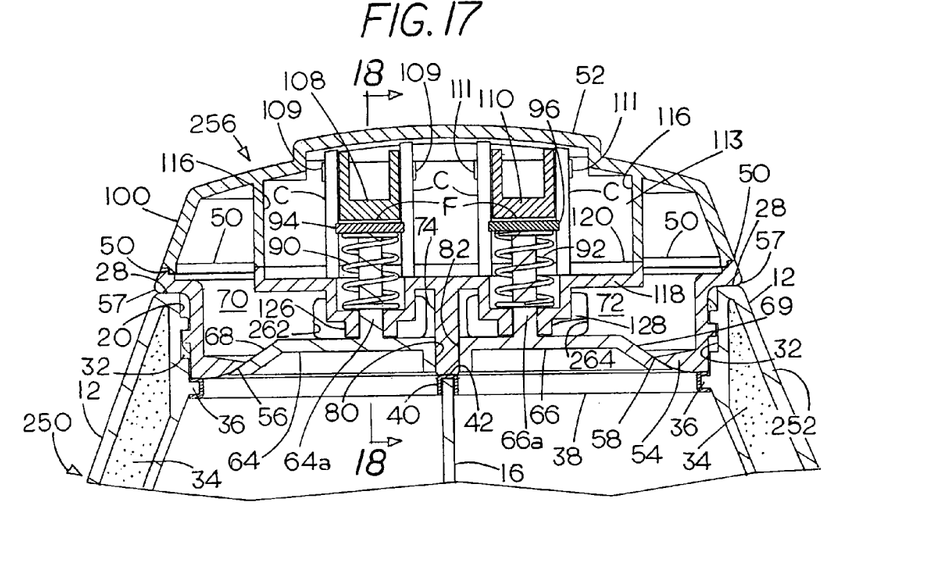
FIG. 17 is a partial vertical sectional view taken on line 17-17 of FIG. 16 on an enlarged scale.
Figure 18:
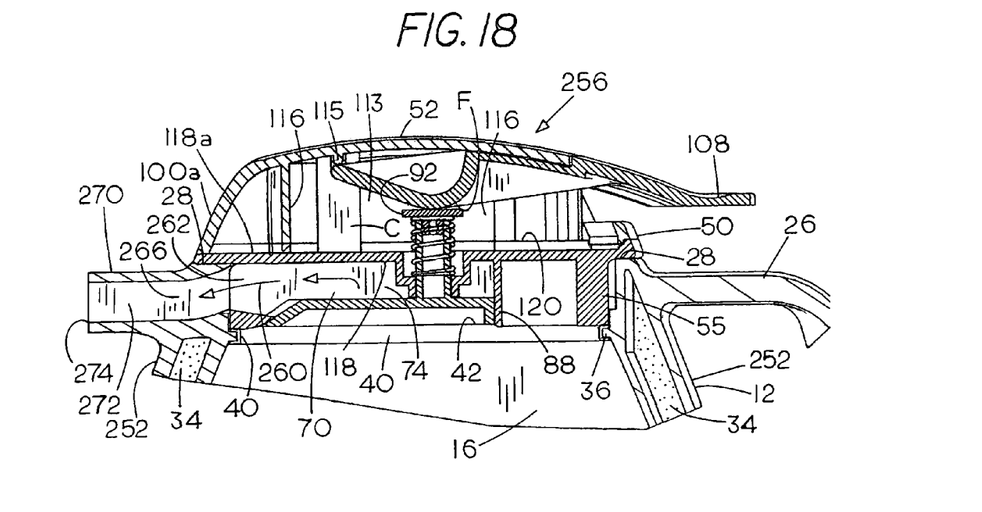
FIG. 18 is a vertical sectional view taken on line 18-18 of FIG. 17.

Refer now to FIGS. 16-18 which illustrate an alternative form of the invention wherein the same numerals refer to corresponding parts already described. The container of FIGS. 16-18 is provided to give greater flexibility with respect to the manufacturing details of the cover and container body as well as to provide an aesthetic alternative that will appeal to a wider audience or to achieve different marketing objectives. In this form of the invention, the container indicated generally at 250 includes a container body 252 with a rearwardly extending handle 254 and a cover 256. The cover 256 is generally similar to cover 44 including a top wall 52 as already described which joins a sidewall 100 as previously described except that the sidewall 100 extends forwardly at 100a around the front of the cover so as to define a front wall of the cover 256 but without the spout of the cover 44. Accordingly, the sidewall 100 extends around both sides as well as around the front at 100a of the cover 256. In this embodiment, the risers 138 and 140 previously described are absent. The panel 118 extends forwardly at 118a and is connected, e.g. by sonic welding at its forward edge to the lower edge of the front wall 100a of the cover 256. Consequently, the beverage flowing upwardly past either of the valves 64 or 66 must flow forwardly as indicated by arrow 260 through either of two outlet ports 262 or 264 on opposite sides of the partition 74 (FIG. 17). When the cover 256 is in place on the container body 252, the ports 262 and 264 are aligned with outlet ducts 266 and 268 of a spout 270 that extends from the container body 252 as a part thereof. The outlet ducts 266 and 268 are separated by a vertical partition 272 within the spout 270 and terminate in outlet nozzles 274 and 276. In this way, the beverage in each of the transfer chambers 70 and 72 flows forwardly on opposite sides of the partition 74 and then through either of the ducts 266 or 268, whichever is selected, and out through the spout 270 through the selected nozzle 274 or 276 without any possibility of becoming mixed anywhere within the container 250. It will be noted that the spout 270 is enclosed on all sides by top, bottom, and sidewalls. This form of the invention provides a slightly lower profile and has different aesthetic qualities that may appeal to certain customers or particular markets. The operation of the embodiment in FIGS. 16-18 is the same as already described except that that beverage passes out through openings in the container body 252 rather than in the cover.

If desired, the spout 270 can be divided into two separate spouts similar to the spouts 150 and 152 of FIG. 13 that are apart from one another as indicated by optional spaced apart intermediate walls shown by dashed lines 280 and 282 of FIG. 16 so that the ducts and nozzles are separated from one another by an open space between the walls 280 and 282.

While the invention is especially well suited for use as a container to serve regular and decaf coffee, it is also excellent for a variety of other beverages such as fruit juices, soda pop, tea, and other drinks. If made of transparent material, either of two differently colored fruit juices can be distinguished before being selected as the dispensing container is passed around the table. In addition, the invention can be used to store and dispense more than two beverages if desired by duplicating storage chambers and valves and nozzles.

Many variations of the present invention within the scope of the appended claims will be apparent to those skilled in the art once the principles described herein are understood.

What is claimed is:

1. A beverage dispensing container with two compartments for beverages, said container comprising, a container body having a vertically disposed partition therein to divide the container into a pair of laterally spaced apart side-by-side beverage storage compartments terminating in an upper open mouth surrounded by a rim, a cover closing the mouth of the container body, said cover including a pair of spaced apart top and bottom walls with a peripheral sidewall connected therebetween, said cover having a pair of separate transfer chambers therein for beverages held within the container body, said cover having left and right valve ports, each communicating with one of the transfer chambers therein, a pair of selectively operable left and right valves, each mounted in the cover for independent movement to open or close one of the valve ports to permit a beverage held in a selected storage compartment of the container to flow through one of the ports into one of the transfer chambers when a corresponding one of the valves is in an open position, the chambers and ports comprising a left chamber and the port that are separated from a right chamber and port to prevent beverages flowing from the storage compartments from becoming mixed together while in the cover and the cover having a pair of forwardly extending passages each terminating in an outlet nozzle located on the front of the cover and at an elevation above the rim of the container, such that one transfer chamber communicates with only one such passage so as to direct the flow of a beverage from each transfer chamber out through one of the nozzles in the cover to permit liquid passing through the valve port of a selected valve to be dispensed from the container through a selected nozzle.

2. The beverage container of claim 1 wherein the passages are positioned in side-by-side relationship on opposite sides of a partition, and each passage communicates with only one of the transfer chambers to prevent mixing of liquid from the separate compartments of the container as a beverage is dispensed from the cover.

3. The dispensing container of claim 1 wherein the cover has a tubular spout containing the nozzles that project forwardly of the cover above the rim of the beverage container body.

4. The beverage-dispensing container of claim 3 wherein the spout includes a pair of integral left and right non-communicating outlet ducts each terminating in one of the nozzles.

5. The beverage-dispensing container of claim 3 wherein the spout has a vertically disposed intermediate partition extending lengthwise therethrough to divide the spout into left and right outlet ducts each terminating in one of the nozzles and each duct communicates with one of the transfer chambers such that during use either of two visibly distinct selected streams of the beverage can be seen by an observer to flow from the cover.

6. The beverage-dispensing container of claim 1 wherein the valves are mounted within the valve ports and the valve ports are positioned below the mouth of the container during use, each such passage is a riser passage leading upwardly from one of the transfer chambers to an elevation above the mouth of the container and the riser passages carry two separate selected ascending streams of beverage to the spout from the valve ports.

7. The beverage-dispensing container of claim 1 in combination with a filling funnel having a sidewall with an upper open mouth, the sidewall terminating at its lower end in a transversely disposed lower wall having an opening in one portion thereof that communicates with a downwardly extending spout which extends into a selected first compartment of the container while a different portion of the lower wall of the funnel covers a top opening of a second one of the compartments whereby when the container is being filled the funnel directs the beverage into the first compartment of the container while preventing the beverage from flowing into the second compartment.

8. The combination of claim 7 wherein the funnel includes a window for viewing indicia provided on an aligned portion of the container below the funnel to allow a person to confirm the filling of a compartment of the container that was selected.

9. The combination of claim 7 wherein a funnel and the container have interfitting shapes to permit the funnel to be mounted upon only one selected compartment of the container.

10. The combination of claim 9 wherein the container is provided with an opening of a different shape on each side of the partition and each opening is shaped to fit a filling funnel bearing indicia that identifies a different selected beverage.

11. The beverage container of claim 1 wherein
the valves communicate with transfer chambers that are separated by a partition located within the cover between the valves and,
the cover partition forms a seal with each of the valves and a seal with a top portion of the partition located within the container body between the storage compartments thereof.

12. The beverage dispensing container of claim 1 wherein the cover is formed from upper and lower cover body portions that are bonded together along an intermediate horizontal seam, and
the valves and the transfer chambers are separated by a partition located within the cover between the valves and,
the cover partition forms a seal with each of the valves and a seal with a top portion of the partition located within the container body between the storage compartments thereof.

13. In a beverage-dispensing container having two storage compartments for beverages and a removable cover with two selectively operable valves therein each communicating with one of the compartments in the container, said container comprising,
a container cover having a pair of transfer chambers extending forwardly therein,
a container body having a pair of beverage outlet ducts that are aliened with said transfer passages when the cover is attached to the container body, said outlet ducts terminating in outlet nozzles that are positioned on the front side of said dispensing container,
each beverage outlet duct communicating interiorly of the cover with only one of the valves such that mixing of beverages entering the outlet ducts from the transfer chambers of the cover is prevented within the cover, and
the ducts comprise a spout that has a vertically disposed intermediate partition extending lengthwise therethrough to divide the spout into left and right outlet ducts each terminating in one of the nozzles and each duct communicates with one of the transfer chamber,
whereby during use a selected one of two separate visibly distinct beverage streams of the beverage can be observed by a user to flow from the duets that extend from the front of the container body for enabling a user to confirm that the beverage being dispensed is the beverage that was selected by the user.

14. The beverage container of claim 13 including a pair of laterally spaced apart beverage outlet ducts as a part of the container body that are separated from one another by an open space to provide a visible separation between streams of beverage that are dispensed through the nozzles of the container body.

15. The beverage container of claim 13, wherein
the valves communicate with transfer chambers that are separated by a partition located within the cover between the valves and,
the partition forms a seal with each of the valves and a seal with a top portion of a second partition located within the container body between the storage compartments thereof.

\* \* \* \* \*

UNITED STATES PATENT AND TRADEMARK OFFICE
CERTIFICATE OF CORRECTION

| | | |
|---|---|---|
| PATENT NO. | : 7,740,153 B2 | Page 1 of 1 |
| APPLICATION NO. | : 11/599564 | |
| DATED | : June 22, 2010 | |
| INVENTOR(S) | : David R. Gustafson | |

It is certified that error appears in the above-identified patent and that said Letters Patent is hereby corrected as shown below:

Column 10, line 25, change "chamber" to -- chambers --.

Column 10, line 28, change "duets" to -- ducts --.

Signed and Sealed this

Seventh Day of September, 2010

David J. Kappos
*Director of the United States Patent and Trademark Office*